United States Patent Office 2,709,649
Patented May 31, 1955

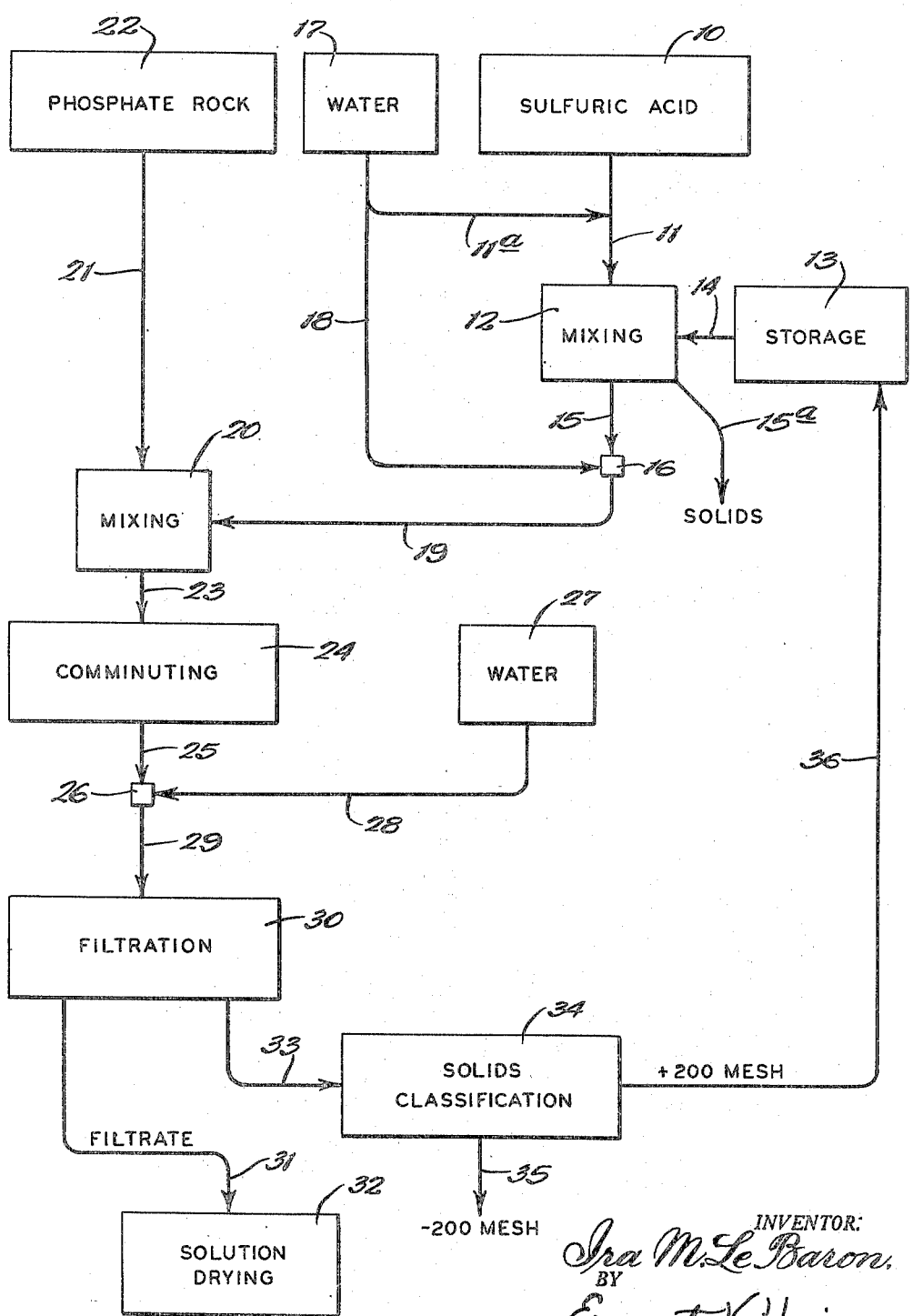

2,709,649
PROCESS FOR PRODUCING PHOSPHATE MATERIAL

Ira M. Le Baron, Lakeland, Fla., assignor to International Minerals & Chemical Corporation, a corporation of New York Application September 26, 1950, Serial No. 186,850

7 Claims. (Cl. 71—40)

This invention relates to a process of producing phosphate material for use as, or in, fertilizers or plant foods. More particularly, it relates to a novel process for the production of a high-grade phosphatic product. Still more particularly, it relates to a new and novel process for the recovery of higher percentages of phosphate from phosphatic material in the form of mono- and dicalcium phosphate than have been attained heretofore.

Various grades of so-called superphosphates are produced. A process in general use prepares high-grade superphosphate by reacting ground phosphate rock with sulfuric acid. The product contains no more than about 20% by weight of available $P_2O_5$, of which about 90% to 95% is present in water-soluble condition. Another process for production of a high-grade superphosphate of commerce is produced by acidifying ground phosphate rock with orthophosphoric acid. This produces a product ordinarily containing about 47% by weight of $P_2O_5$, of which about 90% is available and about 95% of the total available is water-soluble. The terms "water-soluble" and "available" as used herein have a connotation as specified and defined by the Association of Official Agricultural Chemists with reference to the phosphorus content of phosphatic components of fertilizers.

One of the drawbacks to the use of the superphosphates as ingredients of plant foods has been that the $P_2O_5$ content is almost entirely water-soluble, thus making available to plant life a large quantity of $P_2O_5$ at the time of addition to the soil. The ground, therefore, does not hold a supply of $P_2O_5$ which is progressively available. This shortcoming adds to the cost of farming because of the need, particularly in the case of crops such as corn, for the repeated supplying of water-soluble phosphate material during growth of crops, a procedure which is costly, time-consuming and sometimes practically impossible to carry out.

Another drawback has been the percentage of available $P_2O_5$ recovered by previous processes. Phosphate-bearing rock of the so-called low grade contains, after beneficiation, approximately 30% to approximately 31% $P_2O_5$. The processes require the processing of about 69% or 70% of nonphosphatic materials. Inasmuch as recoveries heretofore have generally been less than 90%, particularly where sulfuric acid was utilized, the processes require the handling of approximately 1.1 tons of phosphate rock, whereas efficient recoveries would require the processing of only 1 ton of phosphate rock.

It is an object of this invention to produce a granular nonhygroscopic, free-flowing, high-percentage phosphate component for use in compounding commercial fertilizers.

It is another object of the present invention to provide an inexpensive process utilizing sulfuric acid for reaction with phosphatic rock components which recovers higher percentages of $P_2O_5$ than has been possible with sulfuric acid processes heretofore used.

It is still another object of the present invention to provide a process wherein reacted −200 mesh rock and calcium sulfate are separated from +200 mesh material which contains the major portion of unreacted phosphates, and the latter is recycled in the system for substantially complete removal of phosphatic components.

It is still another object of this invention to produce calcium sulfate crystals which will be of such small size that the crystals are separated as part of the overflow from the classification step and discarded.

These and other objects will become apparent from the following description, and from a study of the figure which is a schematic representation of the processing steps.

Briefly, the improved process comprises admixing phosphate rock with sulfuric acid, leaching the soluble monocalcium phosphate and phosphoric acid from the acid mix, separating insoluble solids from phosphate solution, subjecting the insoluble solids from the reaching step to the action of strong sulfuric acid, and thereafter forming the acid mix of untreated phosphate rock into a composite acid mix containing the composition resulting from the treatment of insoluble solids from the leaching step with strong sulfuric acid.

In a modified form the process comprises admixing phosphate rock with sulfuric acid to form an acid mix, leaching the soluble monocalcium phosphate and phosphoric acid from the acid mix, separating insoluble solids from phosphate solution, segregating the insoluble solids above a predetermined size, subjecting the segregated insoluble solids above predetermined size to the action of strong sulfuric acid, and incorporating the products of reaction of segregated insoluble solids and strong sulfuric acid into the mix of untreated rock and sulfuric acid.

More in detail, the improved process reacts finely divided phosphate rock with sulfuric acid of predetermined dilution. A raw phosphatic rock material comprises essentially tricalcium phosphate or its mineral equivalent; for example, collophane or apatite of either high or low phosphatic content, which content usually falls in the range of approximately 30% to approximately 35% $P_2O_5$. The phosphatic source material is best utilized if it is finely ground, i. e., about 48% to about 80% being capable of passing through a 200 mesh standard screen. Less finely ground material may be used, but the subsequent acidulation requires a considerably longer time to achieve substantial as well as complete conversion. The finely ground material is allowed to react with sulfuric acid under constant and intensive agitation which is of short duration.

The time of mixing is preferably of the order of one to two minutes, which time is sufficient for thorough mixing and at the same time results in the formation of a porous, easily crushed mass of low bulk density. The temperature of the acid fed to the mixer is generally within the range of 65° to about 100° C.

The sulfuric acid mixed with finely ground rock may be of any convenient dilution; for example, about 50% to about 70% sulfuric acid corresponding to 40° to 55° Bé. It will of course be understood that under special conditions concentrations of sulfuric acid higher than mentioned can be utilized. This acid is added to the ground phosphate rock in such a proportion that there will be present in the mix between about 101% and about 110% of the sulfuric acid theoretically required to convert all of the $P_2O_5$ present in the rock to monocalcium phosphate, allowing in addition enough acid to also react with the impurities such as iron, alumina, fluorine, and the like. The acid is preferably added as about 60% to 69% sulfuric acid. The total quantity of acid need not be added all at the same time as a single addition, but may be partially added originally, and the remainder added during or before the subsequent leaching step. Those familiar with the sulfuric acid process will at once recognize that this process is more economical because it utilizes less concentrated acid and smaller amounts of excess acid for the highest recovery of $P_2O_5$ components from the rock. The highest recovery of water-soluble phosphorus values is achieved using about 65% to about 69% sulfuric acid. A maximum recovery is generally obtained using about 66% sulfuric acid with the mix being aged for about two weeks.

The acid mix has been found to set up in about fifteen to about twenty minutes with a dry mass which remains friable for indefinite periods of time. This acid mix, as initially formed, should constitute about 65% solids, but may range between about 45% and about 70% solids. The solidified mix is conveyed directly to succeeding processing steps or it is simply stored until such time as required.

The acid mix is next subjected to a leaching and then a filtration operation. The acid mix is passed through suitable pulverizing apparatus, such as a hammermill, and the powdered product fed to a mixing tank in predetermined quantities where it is mixed with metered quantities of water or dilute monocalcium phosphate aqueous solution. The leaching operation may be carried out at temperatures in the range of about 72° C. to about 82° C. preferred, in order to reduce the viscosity of the solution and improve filtration, provided the mole ratio of $CaO/P_2O_5$ is below 0.7 to prevent formation of insoluble dicalcium phosphate precipitates.

The leaching operation is preferably carried out by the countercurrent flow of solids and liquids. Sufficient liquid leaching medium is added so that the resulting slurry contains between about 35% and about 40% solids, although more concentrated or more dilute slurries may be employed if desired. The agitation and slurrying is for a short period, of the order of about five to about fifteen minutes, either while hot or at atmospheric temperatures.

In the countercurrent operation, water or dilute monocalcium phosphate solution first contacts solids which have passed through successive mixing stages and separations to the last mixing stage. After contact with water, for example, the undissolved solids, after passage through the high concentrate filter, are conveyed to storage for further treatment in the initial acid treatment stages of the process. Rich liquor from the first or filter stage contains approximately 30% to approximately 35% dissolved solids, of which approximately 18% to approximately 22% is phosphate measured as $P_2O_5$ values. This solution is of approximately 31° to approximately 34° Bé. The separation of phosphatic solution and insoluble solids may be carried out in any convenient and conventional manner, such as for example, by filtration, countercurrent multistage centrifuging, or by use of liquid phase cyclone separators.

The phosphate solution recovered from the liquid-solid separation is an aqueous solution of approximately 20% to approximately 33% by weight solids content. The phosphate solution comprises essentially monocalcium phosphate and orthophosphoric acid. This solution is evaporated to dryness by any convenient method, care being taken that solution temperatures do not exceed about 200° C. and preferably do not exceed 150° C. The solution can be evaporated, for example, in vacuum evaporators and the concentrate spray-dried, or the solution can be reduced to substantial dryness as solids having a moisture content of about 1% to about 5%, with or without maintaining a circulating or recycling load of granular material in a rotary kiln. If a circulating load of granular material is used, the solid material is moistened with the solution prior to passage through the kiln. The recycled material may be previously dried phosphate solution, or it may be comminuted limestone, bentonite, and the like. The phosphate solution, after removing water, gives a solid product of the following approximate distribution of constituents (before liming to render the material non-hygroscopic):

| | Percent by weight |
|---|---|
| Total $P_2O_5$ | 60.1 |
| Available $P_2O_5$ | 59.7 |
| Water-soluble $P_2O_5$ | 37.5 |
| Calcium oxide | 14.0 |

Undissolved solids from the last leaching stage consist of calcium sulfate, practically all of which is of −200 mesh size, free grains of silica of both plus and minus 200 mesh size, and partially reacted phosphatic material, practically all of which is of +200 mesh size.

Operation of the process for the formation of small insoluble calcium sulfate crystals, most of which are −200 mesh, is one of the features contributing to the success of the new process. Classification of the discharge from the last leaching stage produces a −200 mesh fraction practically devoid of $P_2O_5$ values, and a +200 mesh fraction containing practically all of the values.

Segregation on the basis of particle size is accomplished in the classification step of the process. Classification may be made upon the basis of recovering particles which are larger or smaller than a predetermined size. Classification is accomplished by a number of well-known methods, such as wet screening, or by means of Dorr or Akins classifiers, and the like.

In the classification step, the amount of recovered +200 mesh material constitutes about 15% by weight of the original rock feed. This +200 mesh material holds about 10% to about 14% by weight of the phosphatic material in the acid mix, which amount is normally lost in the discarded insoluble material.

The salvaged +200 mesh material is next subjected to the action of strong sulfuric acid, which is preferably acid of a strength in the range of between about 70% and 98% sulfuric acid, i. e., an acid of higher concentration than is utilized in the treatment of raw rock. The action can be accomplished by mixing sulfuric acid into the wet solids and discharging the mixture into the main mix of rock and dilute acid. Preferably, however, the solids are discharged into a large mixing tank containing a large excess of sulfuric acid, generally about five hours supply of 70% to 98% sulfuric acid, which acid will, in the course of processing, be diluted to a concentration in the range of 50% to 70% sulfuric acid for mixing with raw rock.

The treatment of +200 mesh material with sulfuric acid is preferably carried out at temperatures in the range of about 18° C. to about 90° C. With solutions approaching the lower concentration limit of 70% sulfuric acid, a higher temperature of reaction is preferred. Heat of dilution of concentrated sulfuric acid drawn from storage at room temperature in general will raise the temperature of the dilute acid solution to a temperature acceptable for processing. If higher temperatures are desired, the temperature may be raised, for example, by direct injection of steam, care being taken to insure that condensed steam does not reduce the concentration of acid below the predetermined concentration at which it is desired to react the +200 mesh material.

When the acid is fed to a mixing tank continuously, the resulting solution overflows the tank while silica and other undissolved material are removed as an underflow from the dissolving tank. The underflow is washed with water to recover acid which acidifies the water, then this is utilized for the dilution step wherein the sulfuric acid is reduced to a concentration found optimum for mixing with the raw phosphate rock feed.

In the operation of one modification of the process of the invention, care should be exercised to maintain intensive agitation for the entire reaction time, where such time exceeds the one to two minute preferred agitation time, during which time the collophane or apatite complex is broken up and practically all of the tricalcium phosphate is converted into water-soluble phosphorus compounds. The temperature of the reaction mix resulting from prolonged agitation usually is between about 45° and about 75° C. During the agitation period, it is important that the mixture be maintained in a fluid condition. If necessary, small additions of each solution are preferred in order to accomplish this. Water may be used, but is undesirable since it must be removed later. An expedient by which heating, agitation, and addition of water is accomplished simultaneously, is through the direct injection of steam into the reaction mixture. This is not preferred for the reason stated. The reacted but unset slurry, without any storage or aging period, is then passed directly to the remaining processing steps hereinbefore described.

Referring to the figure which is a schematic flow plan, sulfuric acid from a storage station 10 is delivered through conduit 11 to a mixing station 12. If the acid is of higher concentration than desired, it may be diluted with water supplied through pipe 11a. Particles of +200 mesh size from the leaching operation, subsequently described herein, are delivered to mixing station 12 from storage station 13 by conveyor 14. The undissolved solids, passing from mixing station 12 are discarded. The decantation liquid passes through piping 15 to a liquid mixing station 16 where it is diluted to the desired acid concentration with water conveyed from storage tank 17 to station 16 through conduit 18.

Dilute acid solution is conducted through pipe 19 to mixing station 20 where it contacts comminuted phosphate rock delivered by conveyor 21 from rock storage station 22.

Acid mix from station 20 is delivered by conveyor 23 to a comminuting station 24. From station 24 the powdered mix is conveyed by a belt 25 to a mixing station 26 where it is mixed with water delivered from storage station 27 through pipes 28 to form a slurry of approximately 30% solids concentration.

Slurry from mixing station 26 is delivered through conduit 29 to the filtration station 30. Filtrate is delivered from filtration station 30 through pipe 31 to solution drying station 32, for recovery of substantially dry monocalcium phosphate. A portion of the filtrate in line 31 may be returned, either continuously or intermittently, to mixing station 26 in lieu of some or all of the water added by means of line 28. This is not shown in the figure.

Solid particles segregated at station 30 are delivered by conveyor 33 to station 34 where the solids are classified to separate the —200 mesh size particles and the +200 mesh particles. The —200 mesh size particles are discarded by discharge through conduit 35 while the +200 mesh size particles are returned to station 13 by conveyor 36 for treatment as above described. While classification is here described as segregation on a plus and minus 200 mesh size, it will be understood that smaller or larger mesh size may be the cut point; for example, 150 mesh or 250 mesh. In some instances, the cut point may be influenced by the particle size of raw rock where, if a particle size of mesh smaller than 200 is utilized, the cut point may be shifted to +150 mesh.

The invention will be more fully understood from the following descripiton which is given by way of explanation, and not with any intention of limiting the invention to the specific conditions set forth.

*Example I*

About 10 tons per hour of Florida phosphate rock was ground to a particle size, approximately 52% of which passes through a 200 mesh screen. This rock analyzed about 67% bone phosphate of lime. The ground rock was mixed with about 6 tons per hour of about 98% sulfuric acid added as 51° to 54° Bé. aqueous solution. The mixture was thoroughly agitated for about one minute, after which it was discharged onto a continuous belt provided with exhaust means for gases such as sulfur dioxide, silicon tetrafluoride, and the like, adjacent the point of discharge of slurry onto the belt. The belt length and its speed were such that the mixture remained on the belt about twenty minutes. The discharge from the belt was stored in a pile for about fourteen days.

The stored material was then removed from storage, broken up, and sufficient water added to give a slurry of about 35% undissolved solids. The slurry was subjected to four stages of continuous countercurrent decantation, followed by a final filtration, to produce a leach solution containing about 30% dissolved solids and being of approximately 32° Bé. gravity. The discarded tailings contain about 2.5% of the 30% total $P_2O_5$, only about one-half of which is available.

The solution was further processed by adding about 0.25 tons per hour of calcium oxide, or its equivalent in calcium hydroxide added in the form of hydrated lime or other suitable calcium oxide source material.

The limed solution was then dried in a rotary kiln at a temperature not exceeding about 200° C., preferably at about 150° C.

This process, on an hourly basis, processes rock having available approximately 3.07 tons of phosphate calculated as $P_2O_5$. The process discards tails containing approximately 0.38 ton of phosphate calculated as $P_2O_5$, or approximately 12% to 13% of the total $P_2O_5$, giving a recovery of approximately 87% to 88% of the available $P_2O_5$.

*Example II*

Phosphate rock from the same source as Example I was ground to a particle size such that approximately 52% passed through a 200 mesh screen. The rock, analyzing about 67% bone phosphate of lime, was mixed with sulfuric acid at a rate of approximately 5.5 tons of acid per 10 tons of ground phosphate rock, the acid being added as approximately 58° Bé. aqueous solution. The mixture was thoroughly agitated for about one minute, after which it was discharged onto a continuous belt. The belt length and speed were such that the mixture remained on the belt about twenty minutes.

Up to this point the operation was the same as Example I except for the smaller quantity of acid utilized.

The acid mix was not sent to storage, although aged mix may be processed in accordance with the instant process. The set acid mix was passed through a clod breaker and the pulverulent product mixed with sufficient water to give a slurry of about 35% undissolved solids. The slurry was subjected to four stages of continuous countercurrent decantation followed by two-stage filtration with a repulping step in between filtrations. The final leach solution contained about 30% dissolved solids and was approximately 32° Bé. gravity. This solution was handled in exactly the same manner as in Example I. The undissolved solids at this stage contained approximately 2.5% of the 30% total $P_2O_5$ in the original rock, representing about 12% loss of $P_2O_5$.

The undissolved solids consisting of unleached mix, adhering leached mix, and calcium sulfate, was then passed through an Akins classifier arranged to separate particles of approximately —200 and +200 mesh size. The —200 mesh undissolved solids comprised predominantly leached mix and calcium sulfate.

The +200 mesh undissolved solids contained little calcium sulfate. The +200 mesh undissolved solids were continuously conveyed to a dissolving tank provided with rotating rakes and containing approximately 25 tons of 70% sulfuric acid. Acid was fed continuously to this tank at a rate of approximately 5.5 tons of acid per hour. The underflow from this tank comprised predominantly silica material. The insoluble silica material was washed with water.

The overflow solution from the dissolving tank was diluted with the water utilized to wash the silica material, and sufficient additional water was used to convert the acid supplied to the mixing station to approximately 58° Bé. aqueous solution. At the mixing station the diluted acid was mixed with raw rock to produce additional acid mix.

When the process was operating continuously, +200 mesh undissolved solids from the classifier contained solids constituting approximately 15% by weight of the original feed, and contained approximately 12% of the P₂O₅ of the original feed.

The —200 mesh insoluble solids and silica material combined, analyzed about 0.5% P₂O₅ corresponding to a throwaway loss of approximately 2.5% of the total P₂O₅ in the raw rock. In other words, the P₂O₅ recovery by this process was approximately 97.5%.

Comparison of the products of Example I and Example II show by analysis about 55.9% P₂O₅ total and about 55.5% P₂O₅ available, of which about 37% is water-soluble. The free orthophosphoric acid content is approximately 5.4%. The calcium oxide content is about 21.1%, and the fluorine content approximately 0.14%. In other words, the products of both processes are substantially identical. The recovery of P₂O₅ values from the rock in Example II, however, is markedly improved over the recovery of P₂O₅ values in the process of Example I, as evidenced by the jump from approximately 88% recovery in Example I to about 97.5% recovery obtained by the new and novel process of Example II.

The product of the process may be used as a source material for conversion to an animal phosphatic feed supplement, as a fertilizer ingredient, as an ingredient for compounding liquid fertilizers, and the like. The product contains sufficient lime, approximately 10% by weight of final dried product, to render the product substantially nonhygroscopic. While lime was the ingredient used in Examples I and II, other inorganic oxygen-containing compounds may be used, such as calcium carbonate, superphosphate, barium hydrate, and the like. The amount of oxygen-bearing compound added depends upon the percentage of solids in the solution and the P₂O₅ content desired in the final product.

Various types of phosphatic material of either high or low bone phosphate of lime content may be employed as feed for the mixing step of this process. Deslimed matrix from the Florida pebble phosphate fields may be employed in either wet or dry condition. Dried phosphate concentrate having a 60–77% bone phosphate of lime content, also Tennessee and Montana phosphate rock, either beneficiated or not, may be employed.

Having thus fully described and illustrated the character of the invention, what is desired to be secured by Letters Patent is:

1. A process of recovering available phosphatic material which comprises admixing ground phosphate rock particles between about 48% and about 80% of which will pass through a 200 mesh standard screen with aqueous sulfuric acid of a strength in the range of approximately 50% to approximately 70% sulfuric acid, leaching the soluble phosphate constituents from the acid mix, separating undissolved solids from the solution of dissolved phosphatic solids, segregating the undissolved solids into portions, one of which contains particles of a class smaller than 150 to 250 mesh and the other portion of which contains particles larger than 150 to 250 mesh, subjecting the portion containing particles larger than 150 to 250 mesh to the action of strong sulfuric acid, incorporating the strong acid and dissolved solid matter into an acid mix of untreated rock and sulfuric acid processed in the initial step, and recovering the dissolved phosphatic solids from the solution of dissolved phosphatic solids leached from acid mix.

2. A process of recovering available phosphatic material which comprises admixing ground phosphate rock particles between about 48% and about 80% of which will pass through a 200 mesh standard screen with aqueous sulfuric acid of a strength in the range of approximately 50% to approximately 70% sulfuric acid to form an acid mix, dissolving the soluble phosphatic constituents by countercurrent washing of the acid mix with water, separating undissolved solids from the solution of dissolved phosphatic solids, segregating the undissolved solids into portions, one of which contains particles of a class smaller than 150 to 250 mesh and the other portion of which contains particles larger than 150 to 250 mesh, subjecting the portion containing particles larger than 150 to 250 mesh to the action of strong sulfuric acid, incorporating the strong acid and dissolved solid matter into a mix of untreated rock and sulfuric acid formed in the initial step, and recovering the dissolved phosphatic solids from the solution of dissolved phosphatic solids.

3. A process of recovering available phosphatic material which comprises admixing raw ground phosphatic rock between about 48% and about 80% of the particles passing through a 200 mesh standard screen with aqueous sulfuric acid in molar excess of up to about 10% over that required to form monocalcium phosphate and to react with impurities present, agitating the admixture for a period in the range of one to two minutes, leaching the soluble phosphate constituents from the acid mix while forming a slurry of a solids content in the range of approximately 28% to approximately 40%, separating undissolved solids from the solution of dissolved phosphatic solids, segregating the undissolved solids into portions, one of which contains particles of a class smaller than about 200 mesh and the other portion of which contains particles larger than about 200 mesh, subjecting the portion containing particles larger than about 200 mesh to the action of strong sulfuric acid, incorporating the strong acid and dissolved solid matter into a mix of untreated rock and sulfuric acid formed in the initial step, and recovering the dissolved phosphatic solids from the solution of dissolved phosphatic solids leached from acid mix.

4. A process of producing available phosphatic material which comprises admixing ground phosphate rock particles between about 48% and about 80% of which will pass through a 200 mesh standard screen with aqueous sulfuric acid of a strength in the range of approximately 50% to 78% sulfuric acid to form an acid mix, leaching the soluble phosphatic constituents from the acid mix, removing the undissolved solids from the solution of dissolved phosphatic solids, separating the undissolved solids into two portions, one portion of which contains solids of a particle size essentially of +200 mesh and a second portion of which contains solids of a particle size essentially of —200 mesh, mixing the +200 mesh particles into a large excess of sulfuric acid solution of approximate strength in the range of 70% to 98% sulfuric acid maintained at a temperature in the range of about 18° to about 90° C., separating the undissolved material from the concentrated acid, diluting the acid and dissolved solids with water to a sulfuric acid strength of approximately 50% to approximately 70% sulfuric acid, incorporating the diluted solution into sulfuric acid-raw phosphate rock acid mix formed in the initial step, and recovering the dissolved phosphatic solids from the solution thereof.

5. A process of producing available phosphatic material which comprises admixing ground phosphate rock particles between about 48% and about 80% of which will pass through a 200-mesh standard screen with aqueous sulfuric acid of a strength in the range of approximately 50% to 70% sulfuric acid to form an acid mix, leaching the soluble phosphatic constituents from the acid mix, removing the undissolved solids from the solution of dissolved phosphatic solids, separating the undissolved solids into two portions, one portion of which contains solids of a particle size essentially of +200 mesh and a second portion of which contains solids of a particle size essentially of —200 mesh, mixing +200 mesh particles into a sulfuric acid solution of approximate strength in the range 70–98% sulfuric acid, continuously removing undissolved particles, washing the undissolved particles with water to recover adsorbed sulfuric acid, continuously removing the sulfuric acid solution at an acid rate required to supply acid to the admixing step, diluting the overflow of acid and dissolved solids to produce a sulfuric acid strength in the range of approximately 50% to 70% sulfuric acid, incorporating the diluted solution into the mix of untreated rock and sulfuric acid of the initial step, and recovering the dissolved phosphatic solids from the solution thereof.

6. A process as in claim 3 wherein the separated phosphate solution is heated to remove substantially all water, and solid material is simultaneously granulated.

7. A process as in claim 6 wherein a sufficient amount of oxygen-containing basic inorganic calcium compound is added to the separated phosphate solution before it is subjected to heat and drying to give the final product substantially nonhygroscopic properties.

References Cited in the file of this patent

UNITED STATES PATENTS

| | | |
|---|---|---|
| 1,851,210 | Palazzo et al. | Mar. 29, 1932 |
| 1,902,648 | Larsson | Mar. 21, 1933 |
| 1,940,689 | Moore | Dec. 26, 1933 |
| 2,115,150 | Seyfried | Apr. 26, 1938 |
| 2,384,773 | Shoeld | Sept. 11, 1945 |
| 2,531,977 | Hammaren et al. | Nov. 28, 1950 |

FOREIGN PATENTS

| | | |
|---|---|---|
| 1,435 | Great Britain | 1898 |
| 165,759 | Great Britain | Nov. 21, 1921 |